United States Patent [19]

Rawson et al.

[11] 3,768,073

[45] Oct. 23, 1973

[54] ENTRY CONFIRMING INPUT TERMINAL

[75] Inventors: Edward B. Rawson, Lincoln, Mass.; William J. Murphy, Jr., Framingham, Mass.; Daniel B. Schwarzkopf; John B. Dowling, both of Stow, all of Mass.

[73] Assignee: Searle Medidata Inc., Waltham, Mass.

[22] Filed: Jan. 3, 1972

[21] Appl. No.: 214,885

[52] U.S. Cl. .......................... 340/172.5, 340/324 R

[51] Int. Cl. .............................................. G06f 3/02

[58] Field of Search ...................... 340/172.5, 324 R

[56] References Cited

UNITED STATES PATENTS

| | | | |
|---|---|---|---|
| 3,673,579 | 6/1972 | Graven | 340/172.5 X |
| 3,487,371 | 12/1969 | Frank | 340/172.5 |
| 3,543,240 | 11/1970 | Miller et al. | 340/172.5 |
| 3,187,321 | 6/1965 | Kameny | 340/172.5 X |
| 3,158,317 | 11/1964 | Alexander | 340/172.5 X |
| 3,388,380 | 6/1968 | Coffin, Jr. et al | 340/172.5 X |
| 3,389,404 | 6/1968 | Koster | 340/172.5 |
| 3,399,401 | 8/1968 | Ellis et al. | 340/172.5 X |
| 3,469,242 | 9/1969 | Eachus et al. | 340/172.5 |
| 3,651,509 | 3/1972 | Dinh-Tuan Ngo | 340/324 R |
| 3,668,654 | 6/1972 | Doersam, Jr. | 340/172.5 |

OTHER PUBLICATIONS

Wolfe, R. N., "Keyboard for Electronic Tablet or Digitizer" in IBM Technical Disclosure Bulletin, Vol. 14, No. 3, Aug., 1971; pp 807–808.

*Primary Examiner*—Paul J. Henon
*Assistant Examiner*—Melvin B. Chapnick
*Attorney*—Joseph Weingarten et al.

[57] ABSTRACT

An input terminal to provide data to a data processor and having a display providing instantaneous confirmation of receipt of correct data by the processor. The terminal has a two-dimensional array of selectively illuminated light emitting diodes, each associated with different data words provided by one of a plurality of overlays. Each diode in the array is activated in two modes, one providing substantially imperceptible, low level illumination and the other providing visible illumination. A light pen is provided to detect the low level illumination as indicative of an operator desire to enter the associated data and convey it to the processor. The processor returns a confirmation message that causes activation of the diode into the visible mode.

16 Claims, 5 Drawing Figures

ENTRY CONFIRMING INPUT TERMINAL

FIELD OF THE INVENTION

This invention relates to data input terminals and in particular to data input terminals having unitary data generation and data confirmation means.

BACKGROUND OF THE INVENTION

Computer assisted data communication between plural remote units is becoming increasingly popular with the general availability of time-shared data processing techniques. In typical applications messages or commands to be conveyed to and acted upon at distant locations are composed and transmitted from one or more plural remote units having data input capabilities. The data communication between these stations is provided through a time-shared data processing system which acts not only to provide routing and communication functions but to compile records based on data flow involving a particular subject and to provide computational or data processing services where required.

In the typical single input computer installation it is customary to provide the operator with a sophisticated complex of data entry, print out and display units whereby the operator can verify that the machine is properly receiving and acting upon the data input. When the computer is adapted on a time-shared basis to function with plural input terminals as indicated above, it becomes too expensive to provide each input terminal with the array of sophisticated display units which are customary with the single input terminal. At the same time it is essential that a form of verification be provided at these plural input terminals so that each user can be certain that the computer or data processor is receiving the message it was intended to convey.

BRIEF SUMMARY OF THE INVENTION

The present invention, according to a preferred embodiment, provides a simple data entry terminal with a minimum of components by uniquely incorporating in single elements the dual functions of data input and verification.

More particularly, the input terminal comprises an array of light emitting diodes which are sequentially strobed with an excitation characteristic providing low level illumination of the diodes. This low level illumination is detected by a light pen selectively placed adjacent one of the diodes in the two-demensional array. The particular diode selected is indicated to a remote data processing system at the time of detection of the low level illumination in the cyclical pattern of strobing.

The selected diode represents a predetermined data message which is indicated to the user by an overlay sheet on the array having printed messages associated with each diode position. With a plurality of overlay sheets available, a coding system is provided in the overlay sheets to trigger detection means that provide a further indication of the particular set of data messages available with that overlay sheet and to correspondingly signal this to the data processing system.

In this manner the data processor receives from each input terminal one or more operator selected messages and provides the indicated signal processing according to system needs and programming instructions. At some point between initial reception of the data messages and completion of its processing thereon, the computer provides a confirmation message back to the input terminal indicating its understanding of the information comprising the data message it has been operating upon. A memory system associated with the input terminal responds to the returned confirming data message to set a predetermined storage location corresponding to that message. Subsequently, the memory system is strobed simultaneously with the sequential, low level activation of each diode in the array and if the corresponding memory location has been activated in response to computer confirming signals, the associated light emitting diode is activated at a high level and more frequent rate to provide a fully visible indication of the message which the computer has received.

If the message displayed by the light emitting diodes is erroneous, or if the operator wishes to change the message, subsequent application of the light pen to that diode may clear the memory of the previous data in the associated storage location and remove the visible indication from the corresponding diode.

BRIEF DESCRIPTION OF THE DRAWINGS

These and other features of the present invention will be more fully understood by reference to the below detailed description of a preferred embodiment presented for purposes of illustration, and not by way of limitation, and to the accompanying drawings of which.

DETAILED DESCRIPTION OF THE PREFERRED EMBODIMENT

Figure 1:
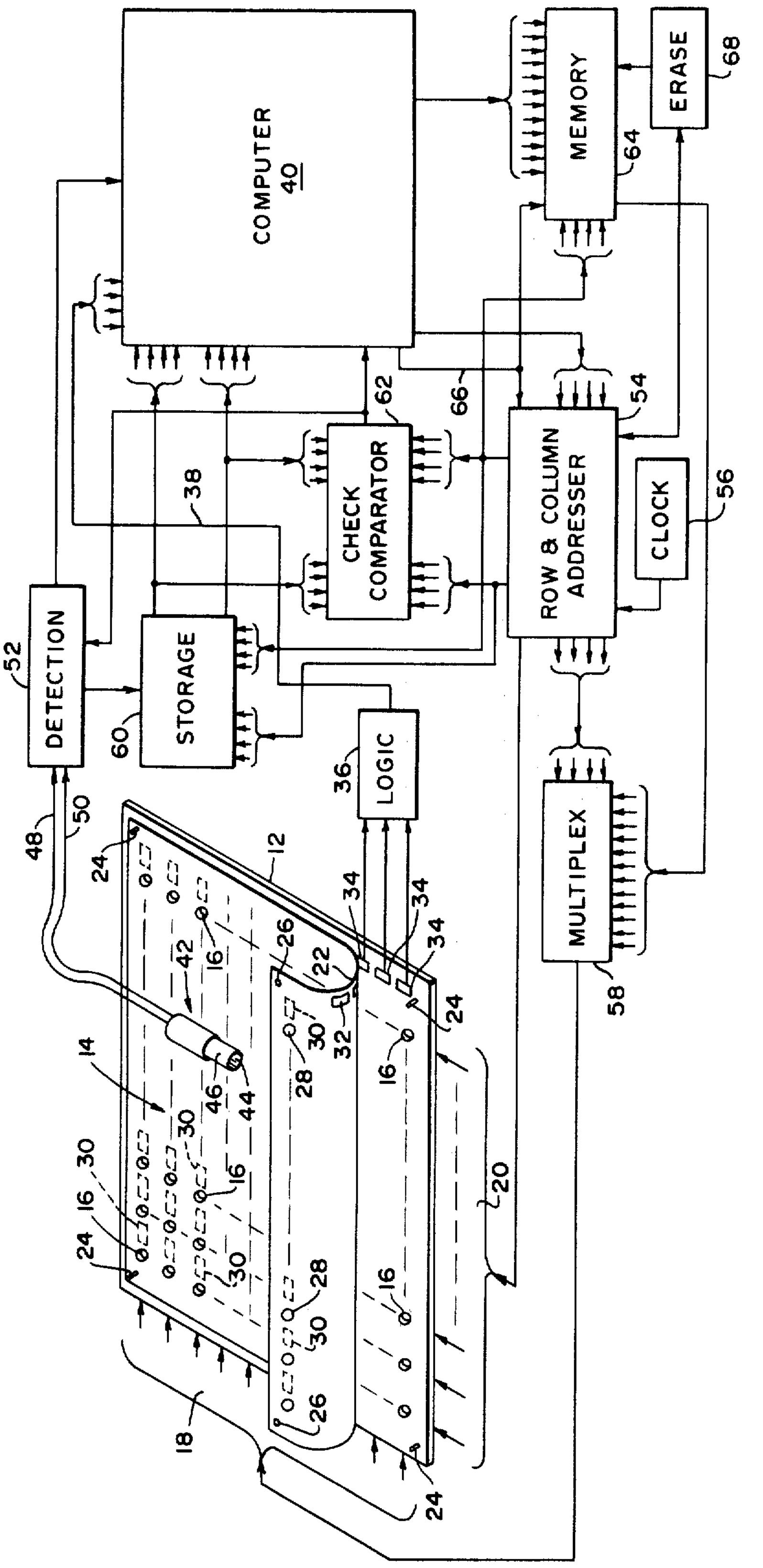
FIG. 1 is a generalized block diagram indicating overall system operation of the input terminal.

Referring now to FIG. 1, indicating a system block diagram for the input terminal, a panel 12 is provided with an array 14 of light emitting diodes 16 electrically accessible through a plurality of row and column inputs 18 and 20 and containing respectively 12 and 16 leads. On the panel 12 an overlay 22 is positioned by locating pins 24 through corner holes 26 in the overlay 22. The overlay 22 contains a plurality of transparent portions 28 which are aligned with the diodes 16 to provide visibility thereof to the operator. Associated with each transparent portion 28, a data message 30 is provided indicating predetermined information which will be interpreted by the operator selecting the associated diode 16.

Rectangular edge portions 32 in the overlay 22 are selectively provided with magnets which cooperate with detectors 34 on the panel 12 when the overlay 22 is positioned on the panel 12 to provide an indication through a logic detection system 36 of the particular overlay 22 in use from a plurality of overlay sheets, each having different arrangements of magnets in the portions 32. Typically the logic 36 responds to the detectors 34, for instance magnetically actuated reed relays, to provide through a system of AND gating an indication of the overlay in place via a data line 38 to a computer or data processor 40.

A light pen 42 is provided with a photodetector 44 at one end and has a slidable end sleeve 46 around the photodetector 44 so as to allow actuation of a switch mechanism within pen 42 when sleeve 46 is pressed over a diode 16. The switch and photodetector signals are applied over respective lines 48 and 50 to a detection system 52 which operates to provide a validated indication of high or low level activation of the diode 16 to which the light pen 42 is applied. Owing to the rapid response characteristics of the light emitting diodes 16, the detection system 52 can provide this signal at nearly the instant of strobed activation of each diode 16.

The diodes 16 are activated in response to binary state outputs of a row and column addresser 54 which has its binary outputs stepped through a number of states corresponding to each of the diodes 16 in response to signals from a clock 56. the binary states of the addresser 54 are decoded to corresponding column inputs for the array 14 and are applied directly to the column inputs 20. The decoded binary states of the addresser 54 corresponding to row inputs 18 are applied through a switch multiplexer 58 to the row inputs 18. The multiplexer 58 functions to apply the binary states to the row inputs 18 for a short percentage of the total time in each binary state in addresser 54 as explained below.

The operation of the addresser 54 causes activation of a unique pair of row and column inputs to the array 14 such that for each binary state a unique diode 16 is accessible for activation and correspondingly illumination through the unique pair of row and column inputs designated. By repetitively cycling through all binary states, the addresser 54 repetitively illuminates each diode 16 for a unique, strobed, instant of time in each cycle. The excitation time provided by the multiplexer 54, and the excitation level are chosen so that the light emitted by each diode 16 is of such a low average level as to give the impression to the observer that the diode is not illuminated.

The resulting level of illumination in each diode 16 is, however, sufficient for detection by the photodetector 44 and detection system 52. The detection system 52 provides an output to a storage system 60 coincident with each detected pulse of illumination from the selected diode 16 to which the light pen 42 is applied. This pulse causes the storage system 60 to respond to the binary state outputs of the addresser 54 applied to it and to store those states for application to the computer 40, and to a check comparator system 62. The check comparator system 62 also receives on a second set of comparison inputs the binary states of the addresser 54. Each time the comparator 62 indicates identical binary state signals on its respective inputs, indicating the addresser system 54 has cycled to the state corresponding to the diode 16 selected by the light pen 42, it produces a signal applied to the detection system 52. The detection system 52 counts to a predetermined number of coincident, sequential applications of the signal from the comparator 62 and light pen 42 without intervening activation of only one of the inputs, and when this predetermined count is reached provides a signal to the computer 40 indicating a validated diode selection is available for reception from the storage system 60.

The computer 40 receives the row and column indication of the diode selected, and correspondingly, by decoding the signal from logic 36, the exact data message associated with the selected diode. The computer 40 will respond, either before or after predetermined data processing steps, by applying the row data to a memory crcuit 64 by activating one row input of the memory 64 and will apply binary column data to a force load input of the addresser 54. Corresponding column binary signals are applied to a column input of the memory 64 from the addresser 54. A load signal on a line 66 from the computer 40 then activates the memory 64 and addresser 54 so that the memory 64 is enabled to respond to the row and column pair indicated by its respective inputs from the computer 40. A storage location in the memory 64 corresponding to the diode 16 that the computer indicates as having been activated is then preset to a predetermined condition.

Row outputs of the memory 64 are applied to a second input of the multiplexer switch 58 through which they are applied to the row input terminals 18 alternately with the row signals from the addresser 54. As a result, as each column input 20 is activated by the addresser 54, each diode in all rows therein is activated if its corresponding storage location in memory 64 for that column has been preset by the computer 40. By causing the addresser 54 to cycle through all column binary states before incrementing the row binary states, the activated diodes 16 are illuminated at a more frequent rate than the low level activation. This in combination with the indicated longer duration of activation, and appropriate selection of the level of activation signal, provides for clear, visible perception of this activation state for each diode 16. In this manner the operator is made aware of the data which the computer 40 has received and can take corrective action to remedy erroneous intepretation by the computer 40.

Figure 3A:
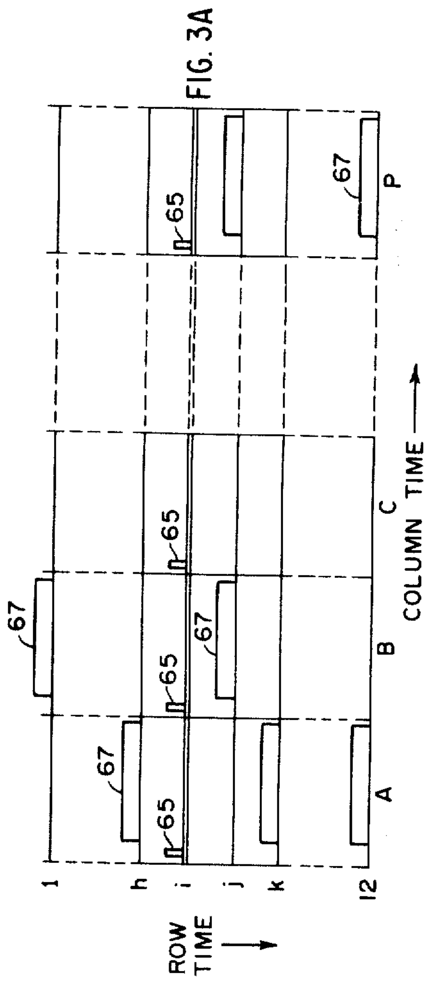
FIGS. 3A and 3B are sequence of operation charts useful in explaining the invention.
Figure 3B:
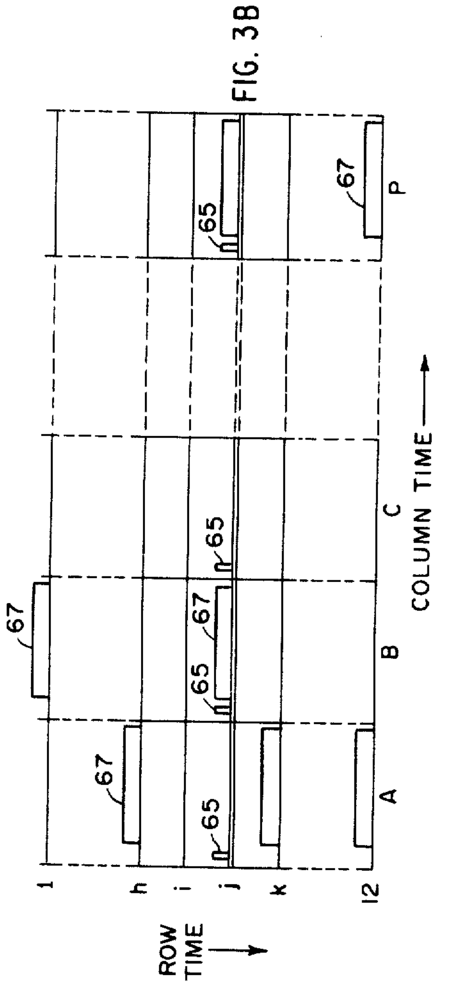

Referring to FIGS. 3A and 3B, the sequence of low level and high level illumination of the diodes 16 in the array 14 can be better understood. In FIG. 3A a chart is shown indicating four exemplary rows, *l, h, i, j, k* and 12 in the twelve rows of diodes and exemplary columns, A, B, C and P in the sixteen columns. In FIG. 3A it is assumed that the "*ith*" row has been addressed by the addresser 54 and that sequentially columns A-P are to be addressed during the time that the "*ith*" row is addressed. Accordingly, along the "*ith*" row, during each column position, a short duration energizing pulse 65 is applied to the corresponding diode. The duration of the pulse 65 is short in comparison to the duration of the access time for that particular diode. As can be seen in FIG. 3A each diode in the "*ith*" row will be sequentially activated with its short duration pulse 65 to provide the low level illumination of the diode. As each column A-P is addressed, each diode in that column which the memory 64 indicates to have been selected, is activated for a longer duration pulse 67, occupying substantially all of the remaining access time, and provides the high level illumination. Then, when the next or "*jth*" row is addressed by addresser 54, as indicated in FIG. 3B, only diodes in the "*jth*" row will be excited with a short duration signal 65 as each column A-P is addressed, but all diodes in each column which the memory 64 indicates as having been selected will be excited with the longer duration signal 67 to produce the high level illumination. Thus, each diode in the array 14 will be excited with the short duration signal 65 only once in each complete cycle of the addresser 54 while all diodes having been selected and so indicated by the memory 64 will be excited once with each cycling of the column addressing and accordingly will be excited twelve times for each complete cycle of the addresser 54. This more frequent rate of excitation in combination with the longer duration of the excitation signal 67 produces a substantially more visible indication from each selected diode.

Correction of errors, or changes in desired data messages are provided by the operation of the processor 40 which responds to activation of each row and column pair to bi-directionally change the state of the storage location in memory 64 so that by first application of the light pen 42 the memory location is established in the predetermined condition to cause visible activation of a diode 16, but in subsequent application of the light pen 42 is reset to the original state to remove that excitation.

An erase system 68 operates in conjunction with the memory 64 and column portion of the addresser 54 to reset all storage locations in the memory 64 in response to an operator activation.

Figure 2:
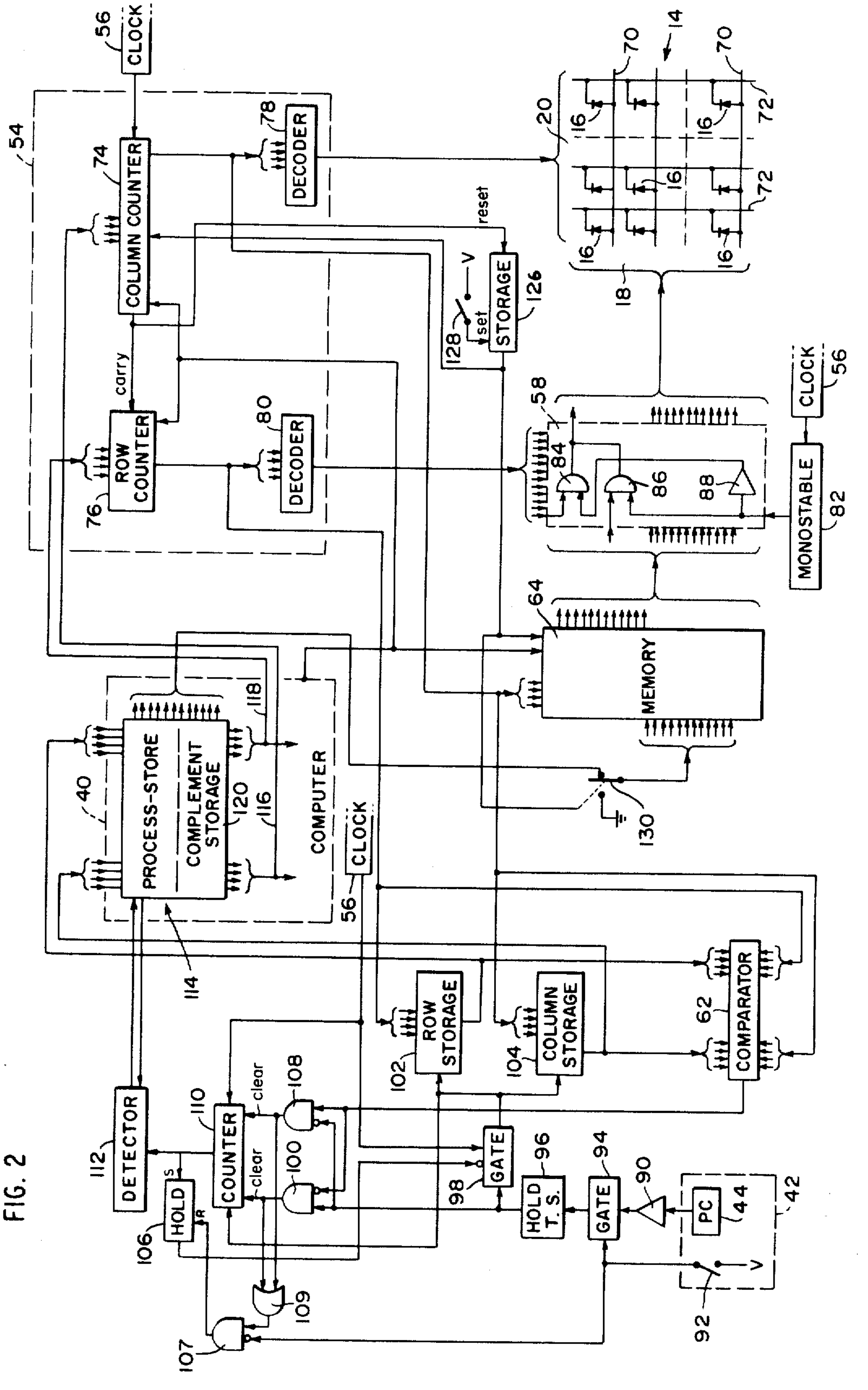
FIG. 2 is a more detailed block and partial schematic diagram of the input terminal.

With the general system structure and operation indicated above in mind, the description will proceed to FIG. 2 presenting detailed implementation of the input terminal system. Indicated in the lower right in FIG. 2, the array 14 comprises a plurality of row and column leads 70 and 72 interconnected by light emitting diodes 16 to form coupled row and column pairs with each coupling diode providing a unique connecting function. The row leads 70 are excited by the row input 18 from the multiplexer switch 58 while the column leads 72 are excited by the column input leads 20 from the addresser 54.

As indicated in FIG. 2, the addresser 54 includes a column counter 74 fed on its input by the clock 56 and having a carry output from its fourth binary stage to a row counter 76. The four binary states of the column and row counters 74 and 76 are applied to decoders 78 and 80, respectively, which provide activation of a unique one of the 16 and 12 different column and row inputs to the array 14 in correspondence with the binary states of the counters.

The decoded binary state of the row counter 76 is applied through the multiplexer switch 58. The switch 58 is driven by a mono-stable circuit 82 from the clock 56 and typically comprises a plurality of AND gates 84 and 86 within switch 58. Gate 84 typically receives as one input one of the twelve row leads from decoder 80 and as a second input, the output of the mono-stable circuit 82 from an inverter 88. The gate 86 receives one of the 12 row lines from the memory 64 on the input and on the other input the direct output of the mono-stable circuit 82. The output of the gates 84 and 86 are combined to provide one of the twelve row inputs 18 into the array 14.

The mono-stable circuit 82 is triggered by the clock 56 to assume one binary state for a relatively short, initial portion of the access time for each diode 16 and then to reset itself for the remainder of the access time to its stable condition. In this manner the active output of the decoder 80 applies a signal to the appropriate row input 18 for a short inverval followed by a longer interval in each access time wherein all the outputs from the memory 64 are applied to the row inputs 18.

Turning now to the light detecting pen 42 in the lower left hand corner of FIG. 2, the photodetector 44 output current is applied to an amplifier 90 and subsequently a gate 94 which is controlled by actuation of a switch 92 in pen 42. Switch 92 applies an enable voltage to the gate 94 in response to pressure on the sleeve 46 indicated in FIG. 1. The amplifier 90 is preferrably of sufficient gain and saturating design to have a "zero" binary state output when switch 92 is open or substantially no light is received by photodetector 44 but to have a binary "one" output when switch 92 is closed and the photodetecter 44 receives low level illumination from a selected diode 16. The output of gate 94 is applied to a temporary store circuit 96 providing temporary storage effectively stretching the duration of the short pulse from the photodetecter 44 one clock interval. The output of the store circuit 96 is applied to a gate 98 and inverting and noninverting inputs of gates 108 and 100. The gate 98 passes the output of the hold circuit 96 to row and column storage circuits 102 and 104, respectively, as store inputs upon coincidence of a stretched signal from the store circuit 96 and a clocking signal from the clock 56 also applied to the gate 98. An inverted inhibit input from a hold circuit 106 is normally activated to enable gate 98 except as explained below. Hold circuit 106 is reset by an AND gate 107 in response to an inverted input from switch 92 and an input from an OR gate 109. OR gate 109 responds to clear signals from either gate 100 or 108.

The store inputs to the row and column storage circuits 102 and 104 from gate 98 cause these storage units to respectively receive and store the binary state outputs of the row and column counters 76 and 74. The binary states of the row and column storage circuits 102 and 104 are then applied to respective first and second portions of comparator 62. These first and second portions also receive on comparisons inputs the binary state outputs respectively of the row counter 76 and column counter 74. The identity detection output of the comparator 62 is applied as an enable control to an inverting input of the gate 100 and noninverting input of gate 108. The outputs of the gates 100 and 108 are applied as clear inputs to a counter 110. The counter 110 is incremented one digit upon each output of the gate 98. When the counter 110 reaches a predetermined count, such as eight, it provides a set output to the hold circuit 106 and to a detector circuit 112. The gate 100 functions to provide a clear output to the counter 110 whenever the store circuit 96 indicates a detected light signal but there is no identity output from the comparator 62. The gate 108 provides a clear output whenever the comparator 62 indicates an identity signal but there is no indication of detected light from the store circuit 96. In this manner, the counter 110 is reset and never allowed to attain its predetermined count if during the interval to that count there is an error indication representing uncertainty in the diodes being sampled. This effectively eliminates the chance of erroneous actuation of the system from noise, background illumination, or momentary diode selection.

When the counter 110 ultimately reaches its predetermined count and provides an output, the hold circuit 106 is set and feeds an inhibit signal to the gate 98 preventing further store signals to the row and column storage circuits 102 and 104 until the computer 40 reads their contents. The computer is caused to read the row and column storage circuits by detector 112 sensing a count complete signal from the counter 110. When the data is read, computer 40 signals the detector 112 and hold circuit 106 to reset them. Resetting of the hold circuit 106 is accomplished when switch 92 is opened and either gate 100 or 108 provides a clear signal as will happen when the light pen is removed from a diode.

Within the computer 40, a process-store system 114 operates on the received data from the row and column storage units 102 and 104 and provides binary state outputs on respective lines 116 and 118 representative of the computer's interpretation of the received data after the process-store operation in system 114. The system 114 can range from a straight through connection to a system performing significant data processing and subsequent reinterpretation of the original input data as a result thereof in providing the signals on lines 116 and 118. The signals on these lines are applied respectively to the row and column counter 76 and 74. The process-store system 114 also provides decoding of the row data on line 116 into twelve parallel lines for application to the memory 64.

Erasing a particular selection for an individual diode 16 is accomplished within the computer 40 by a complement-storage section 120 of the process-store system 114. Effectively, the complement store system 120 responds to an indication of selection of an individual diode and operates with a storage file of the process-store system 114 to complement the condition of that storage location thereby providing to memory 64 an indication of the state of the corresponding storage location opposite to the then existing state. It is of course possible to achieve the complementing function directly within the memory itself, but by using the computer 40 alone, there is greater assurance that the computer 40 and memory 64 will contain some data.

The erase function for the memory 64 is accomplished with a store circuit 126 which is activated into a predetermined condition by closure of a switch 128. The corresponding output of the store circuit 126 resets column counter 74 and is applied to a switch 130 causing all row inputs of memory 64 to be grounded. Then, as column counter 74 counts through each column state, every memory location in the memory 64 is cleared, a column at a time. A reset signal is applied to the store circuit 126 from the carry output of column counter 74 upon completion of a full cycle by that counter.

Figure 4:
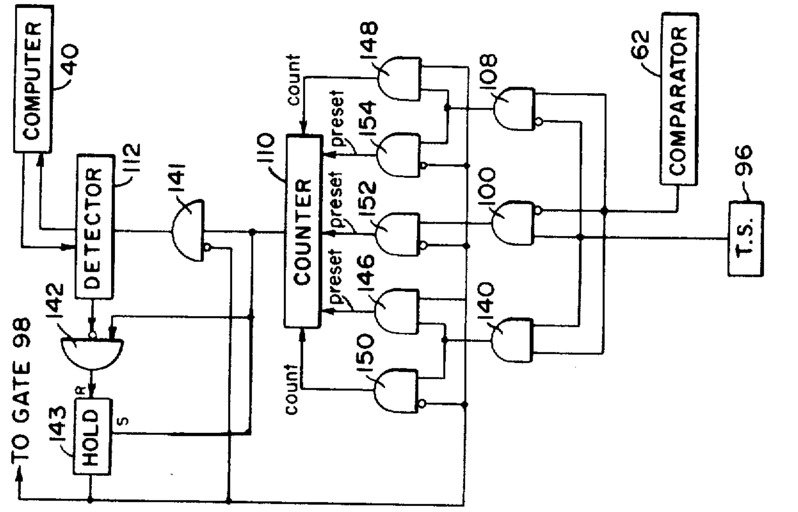
FIG. 4 is a block diagram of a portion of FIG. 2 showing a modification.

Referring now to FIG. 4 a modification is shown for implementing additional verification of diode selection. The gates 100 and 108 operate as in FIG. 2 with the signals from the comparator 62 and hold circuit 96 applied thereto. The signals from the comparator and store circuit 62 and 96, respectively, are also applied at non-complementing inputs to an AND gate 140.

The counter 110 has a count complete signal applied to AND gates 141 and 142 and to a set input of a hold circuit 143. Gate 141 receives the output of hold circuit 143 on a complementing input and itself feeds a set input of detector 112. Detector 112 provides an output to computer 40, which, in accepting data, feeds a reset signal back to detector 112. The output of detector 112 is also applied to a complementing input of gate 142.

The output of the hold circuit 143 is applied to gate 98 and non-complementing inputs of AND gates 146 and 148 and to complementing inputs of AND gates 150, 152 and 154. Second inputs of gates 154 and 148 are received from the gate 108. The gate 152 receives on a non-complementing input the output of gate 100. Gates 146 and 150 receive on second inputs the output of gate 140. The outputs of gates 152 and 154 are provided as preset inputs to the counter 110 while the outputs of gates 148 and 150 are applied as count inputs. Gate 146 provides a preset input to a different state than gates 152 and 154.

In operation, the circuit is waiting for selection of a diode when the hold and detection circuits 143 and 112 are in a reset condition and gate 142 is not activated. When a selection has been made the comparator 62 and store circuit 96 provide signals which, as before, result in counting by the counter 110 to a predetermined state through gate 150. The counter is preset through gates 152 and 154 during this count if only one of the circuits 62 and 96 have activated outputs.

When the counter 110 reaches the predetermined count, the detector 112 is set and after gate 142 is disabled thereby hold circuit 143 is set. The hold circuit 143 applies a signal, as indicated in FIG. 2, to the gate 98 to inhibit further acquisition of data by the row and column store circuits 102 and 104 and to gate 141 to prevent further setting of detector 112. Circuit 143 further enables gates 146 and 148. The detector 112 provides a signal to the computer 40 indicating that data is available. When the computer has received it, a return signal is provided to the detector 112 resetting it, and enabling the gate 142 to respond to counter 110. Under these conditions, with the gates 150, 152 and 154 disabled, the counter 110 will count through gate 148 in response to signals from the comparator 62 if no coincident signal occurs from the store circuit 96 to accumulate a predetermined count, which may be different from the original count. The counter is preset by gate 146 if both outputs from comparator 62 and store circuit 96 occur simultaneously. When the count is reached the hold circuit 143 is reset by the corresponding output of counter 110 and the original conditions for the receipt of new data are established.

This technique eliminates the problem of a diode being selected twice inadvertently because the light pen is momentarily moved off the diode after it has resulted in acceptance of data and then moves back onto the diode. Without the FIG. 4 circuitry the selection of that diode and associated data could be cancelled. In the circuitry of FIG. 4 the switch 92 and associated logic provides redundant functioning and may be eliminated.

The count may be different for different parts of the array 14 to vary the timing in correspondence with different characteristics. This would allow part of the array to consist of pushbuttons rather than light emitting diodes to accomplish specific purposes.

Having above described a preferred embodiment for the data entry confirming input terminal according to the invention, it will occur to those skilled in the art that modifications and alterations can be made to the disclosed embodiment without departing from the spirit of the invention. Accordingly it is intended to limit the scope of the invention only as indicated in the following claims.

What is claimed is:

1. A data entry terminal for enabling operator entry of input information to a data processing system and for displaying for operator viewing a confirming indication of receipt of proper data by said data processing system, said terminal comprising:

a plurality of separate discrete elements arranged in an array of said elements wherein said elements are operative in response to an excitation signal to emit a visible indication;

means for sequentially activating each of the elements in said array with an excitation signal having a characteristic which produces a low level emission;

operator controlled means for detecting the low level emissions of said elements, said detecting means being operative for detection of the emission from a selectable element from said array of elements;

means operative in response to the detection of low-level emissions for providing an indication of the selected one of said elements;

means for communicating to said data processing system the indicated element, said data processing system being operative to provide a return signal which represents the indicated element as received by said data processing system; and means responsive to said return signal for generating an excitation signal for the corresponding element with a characteristic to provide high level emission from said corresponding element.

2. The data entry terminal of claim 1 wherein said elements are light emitting diodes.

3. The data entry terminal of claim 1 further including:

a plurality of overlays adapted for placement over said array of elements to associate predetermined data with each of said elements;

each of said plurality of overlays having identifying means to distinguish itself from said plurality of overlays; and means for providing an indication to said data processing system of the identity of the overlay in place over said array of elements.

4. The date entry terminal of claim 1 further including means for discriminating against communicating to said data processing system erroneous indication for selected elements.

5. The data entry terminal or claim 1 further including:

means for detecting a predetermined number of sequential activations of the same element coincident with detection of low-level emission of said same element; and means to inhibit communication of the indicated element to said data processing system until said predetermined number is detected.

6. The data entry terminal of claim 1 wherein said detecting means is operative to reject sequential detection of low-level emission of the same element without a predetermined interval therebetween.

7. A data entry terminal for providing entry by an operator of predetermined data to a data processing system and to display an acknowledgement of receipt of the entered data from said data processing system, said data entry terminal comprising:

a plurality of separate discrete elements arranged in an array of said elements wherein each of said elements is actuateable in response to an excitation signal to provide a light emission;

means for sequentially addressing each of said elements in said array in a repeating pattern to provide a period of access to each of said elements in each repeating pattern;

means for applying a first excitation signal to each of said elements during its corresponding access time, the applied first excitation signal having a characteristic which produces low-level illumination of said elements;

memory means having a storage location corresponding to each of said elements in said array;

means for applying a second excitation signal to each of said elements in said array during at least its access time in response to the corresponding storage location in said memory means being in a predetermined condition, said second excitation signal having a characteristic which produces high-level illumination in each of said elements;

operator controlled means for sampling the illumination of one or more of said elements to provide a detection signal;

means responsive to said detection signal and operative in association with said addressing means for indicating to said data processing system the identity of the sampled element;

said data processing system responding to the indication of the sampled element to provide a confirmation signal corresponding to the indicated, sampled element; and means operative in response to said confirmation signal to cause the storage location in said memory means corresponding to the element indicated by said confirmation signal to be placed in said predetermined condition whereby the corresponding element is subsequently activated to provide said high level illumination.

8. The data entry terminal of claim 7 wherein said elements are light emitting diodes, each of said light emitting diodes providing connections between a unique combination of a row and column input to said array of elements.

9. The data entry terminal of claim 8 wherein said addressing means includes a clock operated counter having first and second sets of decoded binary outputs connected respectively to row and column terminals of said array of elements.

10. The data entry terminal of claim 9 further including:

switch means for selectively connecting the row outputs of said counter to the corresponding row terminals of said array of elements;

said switch means having a further input from said memory means alternatively connected to the corresponding row terminals of said array of elements;

said memory means being operative to provide to said switch means signals indicative of the condition of the storage location corresponding to all elements in the column of said array addressed by the second set of binary states in said counter whereby the elements in said array are activated with said high level illumination substantially more frequently than the low level illumination activation of said elements; and means for causing said switch means to connect to said row terminals of said array, during each access time, signals from said counter for a relatively short portion thereof and signals from said memory means for a relatively long portion thereof.

11. The data entry terminal of claim 7 wherein said sampling means include means for discriminating against erroneous indications of sampled activation of said elements.

12. The data entry terminal of claim 11 wherein said discriminating means includes:

means for counting a predetermined number of sampled activations of the selected one of said elements in sequence without interruption; and means for generating said detection signal only in response to said counting means reaching said predetermined number.

13. The data entry terminal of claim 11 wherein said discriminating means includes:

means for inhibiting said indicating means for an interval after each indication thereby to said data processing system.

14. The data entry terminal of claim 7 further including:

means for clearing a storage location of said memory means of said predetermined condition in response to operator activation thereof.

15. The data entry terminal of claim 14 wherein said clearing means is operative to clear all storage locations of said memory means and includes:

means operative in association with said addressing means for clearing of the corresponding storage locations in said memory means over a partial cycle of said addressing means.

16. The data entry terminal of claim 7 further including means for changing the condition of each storage location in said memory means bi-directionally between binary states in response to said detection signal whereby each storage location in said memory means can be set to said predetermined condition by selected sampling of the corresponding element, and reset from said predetermined condition in response to subsequent sampling of the same element.

* * * * *